United States Patent
Mason, Jr. et al.

(10) Patent No.: US 6,731,483 B2
(45) Date of Patent: May 4, 2004

(54) CIRCUIT BREAKER WITH SINGLE TEST BUTTON MECHANISM

(75) Inventors: Henry Hall Mason, Jr., Farmington, CT (US); Craig B. Williams, Avon, CT (US); Cecil Rivers, Jr., Roanoke, VA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/248,758

(22) Filed: Feb. 14, 2003

(65) Prior Publication Data

US 2003/0107854 A1 Jun. 12, 2003

Related U.S. Application Data

(63) Continuation of application No. 09/683,138, filed on Nov. 26, 2001, now Pat. No. 6,538,862.

(51) Int. Cl.[7] .............................. H02H 3/16; H02H 3/52
(52) U.S. Cl. ...................................... 361/42; 361/93.1
(58) Field of Search .......................... 361/42, 87, 93.1; 335/18, 6

(56) References Cited

U.S. PATENT DOCUMENTS

| | | | | |
|---|---|---|---|---|
| 4,015,169 A | * | 3/1977 | Misencik | 317/18 D |
| 5,546,266 A | * | 8/1996 | McKenzie et al. | 361/93 |
| 5,969,921 A | * | 10/1999 | Wafer et al. | 361/45 |
| 5,982,593 A | * | 11/1999 | Kimblin | 361/42 |
| 6,392,513 B1 | * | 5/2002 | Whipple et al. | 335/18 |
| 6,538,862 B1 | * | 3/2003 | Mason et al. | 361/42 |

* cited by examiner

Primary Examiner—Brian Sircus
Assistant Examiner—Z Kitov
(74) Attorney, Agent, or Firm—Cantor Colburn LLP

(57) ABSTRACT

A method and apparatus for a circuit breaker having an arc fault detection circuit, a ground fault detection circuit, a signal indicative of an arc fault in a corresponding pole of the circuit breaker; and a trip mechanism including a pair of separable contacts. The trip mechanism is in operable communication with the ground fault detection circuitry so than in response to receiving the signal from the ground fault detection circuitry, the arc fault detection circuitry causes the ground fault detection circuitry to generate a trip signal causing the trip mechanism to separate the pair of separable contacts.

37 Claims, 7 Drawing Sheets

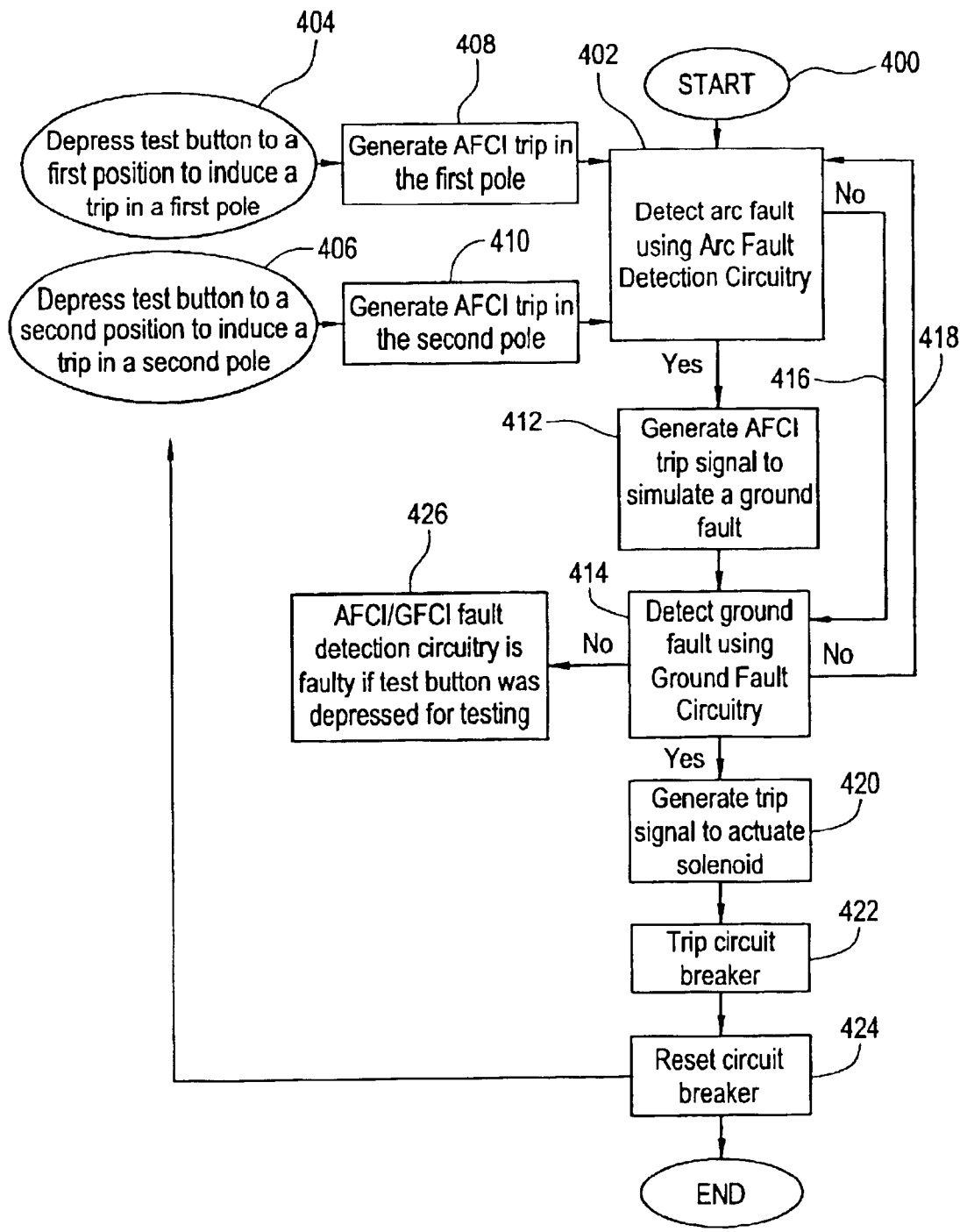

CIRCUIT BREAKER WITH SINGLE TEST BUTTON MECHANISM

CROSS REFERENCE TO RELATED APPLICATIONS

This application is a continuation of U.S. patent application Ser. No. 09/683,138 filed on Nov. 26, 2001, now U.S. Pat. No. 6,538,862, the contents of which are incorporated herein by reference thereto.

BACKGROUND OF THE INVENTION

Conventional residential, light industrial and commercial circuit breakers typically have a thermal trip mechanism which responds to persistent overcurrents of moderate magnitude to provide a delayed trip in the breaker. Also included in the circuit breaker is a magnetic trip mechanism which responds instantaneously to overcurrent conditions of greater magnitudes. It is becoming more common for these circuit breakers to further include a ground fault trip mechanism as one of the active mechanisms. The ground fault trip mechanism includes a trip unit which detects faults between the line conductor and ground and the neutral conductor and ground. Line to ground faults are commonly detected by the use of a differential transformer. The line and neutral conductors are passed through the coil so that in the absence of a line to ground fault, the currents are equal and opposite and no signal Is generated. However, when a line to ground fault exists, it creates a sizeable imbalance between the two currents in the two conductors which can be level detected. As is known, a neutral to ground fault may be detected by injecting a signal onto the neutral conductor which will produce an oscillation if feedback is provided.

In addition, conventional circuit breakers include mechanisms designed to protect against arc faults. For example, an arc fault may occur in the device when bare or stripped conductors come into contact with one another and the current caused by such a fault produces magnetic repulsion forces which push the conductors apart, thereby striking an arc. The arc that is caused by these faults can damage the conductors by melting the copper therein and this is especially true for stranded wire conductors such as extension cords, which can ignite surrounding materials.

Typically, the circuit breaker includes contacts that open upon sensing arcing from line to ground and/or from line to neutral. Arc fault circuit breakers typically use a differential transformer to measure arcing from line to ground. Detecting arcing from line to neutral is accomplished by detecting rapid changes in load current by measuring voltage drop across a relatively constant resistance, usually a bi-metal resistor.

Unfortunately, many conventional circuit breakers, including residential circuit breakers, do not permit the user to test both the arc fault circuit interrupter (AFCI) and ground fault circuit interrupter (GFCI) circuits in the device. On the other hand, if these circuit breakers allow the user to test both the AFCI and GFCI circuits, these circuit breakers necessitate the use of an opto-coupler to pass the trip signal while electrically isolating the two line phases from the detection circuitry. In addition, the prior art requires using two test switches, one switch for each phase, testing both ground fault and arc fault. Furthermore, the ability to test both of these detection circuits is very important for customer safety and because a vast amount of individuals do not understand the implications of a circuit failure, it is important to best educate these individuals about these implications and what systems are available to minimize the likelihood that such a circuit failure occurs.

BRIEF DESCRIPTION OF THE INVENTION

The above discussed and other drawbacks and deficiencies are overcome or alleviated by a method and apparatus for a circuit breaker having an arc fault detection circuit, a ground fault detection circuit, a signal indicative of an arc fault in a corresponding pole of the circuit breaker; and a trip mechanism including a pair of separable contacts. The trip mechanism is in operable communication with the ground fault detection circuitry so that in response to receiving the signal from the ground fault detection circuitry, the arc fault detection circuitry causes the ground fault detection circuitry to generate a trip signal causing the trip mechanism to separate the pair of separable contacts. In an exemplary embodiment, a switch assembly is included for switching to a corresponding pole to test arc fault and ground fault functionality. The switch assembly is switchable between a first position and a second position corresponding to two different poles of the circuit breaker. The first position comprises a test position for an AFCI circuit associated with one pole and the second position comprises a test position for another AFCI circuit associated with another pole. In either the first or second position, AFCI circuitry initiates a trip by generating a current imbalance causing the GFCI circuitry to generate a trip signal for tripping the circuit breaker. Thus, the present disclosure permits the customer to test both the AFCI and GFCI circuits by positioning a switch assembly accordingly in either the first or second test button positions.

The above discussed and other features and advantages of the present invention will be appreciated and understood by those skilled in the art from the following detailed description and drawings.

BRIEF DESCRIPTION OF THE DRAWINGS

3Referring now to the drawings wherein like elements are numbered alike in the several Figures:

FIG. 9 is a flowchart illustrating operation of AFCI and GFCI circuit testing and AFCI circuitry use of the GFCI detection circuit as a tripping mechanism.

DETAILED DESCRIPTION OF THE INVENTION

Figure 1:
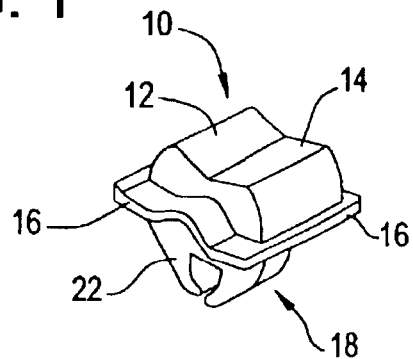
FIG. 1 is a perspective view of a single test button for use in a dual test mechanism in accordance with an exemplary embodiment.

Referring to FIG. 1, an exemplary single test button for use to check both AFCI and GFCI circuits in a multiple pole circuit breaker 100 (FIG. 4) is generally shown at 10. Test button 10 includes a first cantilevered surface 12 and a second cantilevered surface 14 which are designed as surfaces for the user to depress depending upon which of the two poles/phases is to be tested in circuit breaker 100. More specifically, first cantilevered surface 12 is depressed if testing of the AFCI circuit of the first pole is desired and second cantilevered surface 14 is depressed if testing of the AFCI circuit of the second pole is desired. First and second cantilevered surfaces 12 and 14 are integral with one another and converge along a central line. A perimetric lip 16 extends around first and second cantilevered surfaces 12 and 14 so that surfaces 12 and 14 extend above perimetric lip 16. A bottom portion of test button 10 comprises a clamp member 18 which receives a pivotable leaf spring 20 which forms a part of a test button assembly 32 (shown in FIG. 2). Clamp member 18 has a pair of biasing arms 22 which securely hold pivotable leaf spring 20 therebetween. Pivotable leaf spring 20 pivots when either first or second cantilevered surfaces 12 and 14 are depressed. Preferably, test button 10 is formed of a plastic material as is known in the art.

Figure 2:
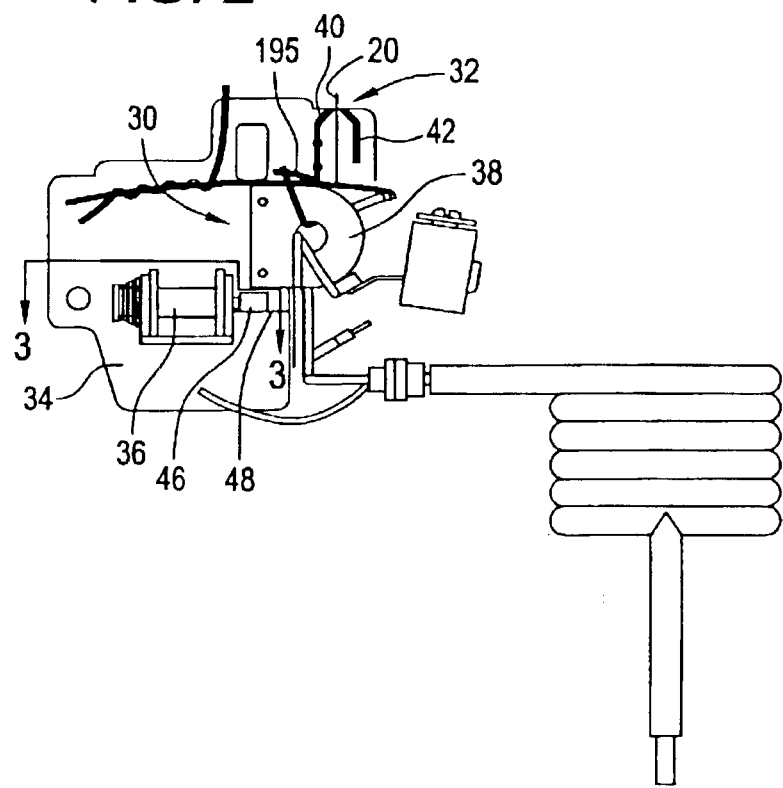
FIG. 2 is a side elevation view of an exemplary printed circuit board layout in accordance the embodiment shown in FIG. 1.
Figure 3:
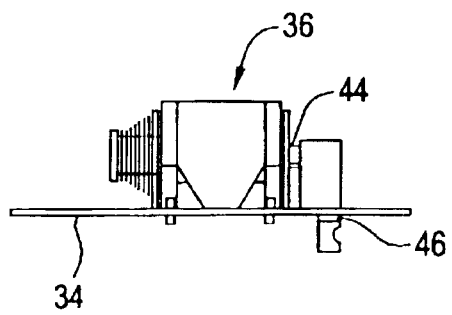
FIG. 3 is a bottom plan view of the printed circuit board of FIG. 2 taken along the line 3—3.

Turning now to FIGS. 1–3 which illustrates exemplary current sensing components 30 for use in circuit breaker 100 (FIG. 4) along with test button assembly 32. Current sensing components 30 comprise a circuit board 34 which is electrically connected to a solenoid 36 and a current sensing transformer 38. Furthermore, test button assembly 32 includes signaling components comprising a pivotable leaf spring 20 which is disposed intermediate a first flat 40 and a second flat 42, all of which are electrically connected to circuit board 34. Pivotable leaf spring 20 is preferably a planar member, while first and second flats 40 and 42 each have a lower planar segment and an angled upper segment which is inclined toward pivotable leaf spring 20. It will be understood that test button 10 is secured to pivotable leaf spring 20 by simply inserting a top end of pivotable leaf spring 20 within clamp member 18. The biasing forces of the pair of arms 22 pinch and hold pivotable leaf spring 20 in place.

Figure 4:
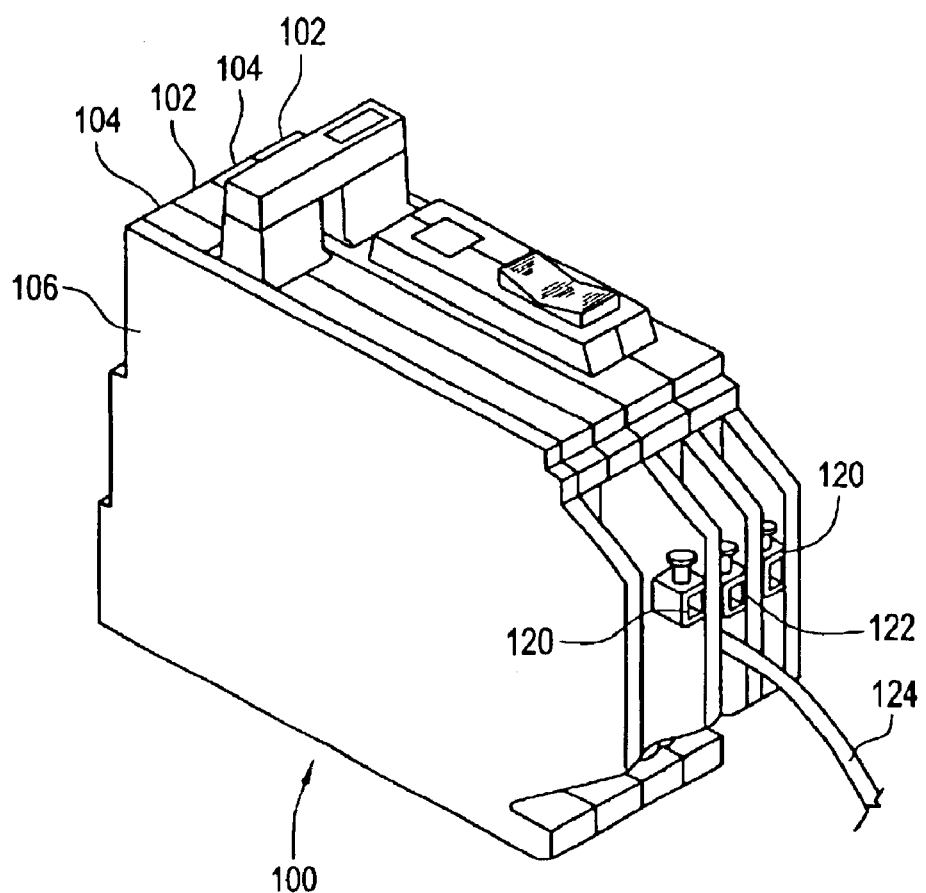
FIG. 4 is a perspective view of a double pole circuit breaker for use with the exemplary embodiment of the single button dual test mechanism.

Test button assembly 32 comprises a two position switch assembly (AFCI for the first pole and AFCI for the second pole), wherein depressing first cantilevered surface 12 causes pivotable leaf spring 20 to contact second flat 42 resulting in a first signal being injected into circuit board 34, wherein the first signal comprises a test signal for the AFCI first pole circuit. In contrast, depressing second cantilevered surface 14 causes pivotable leaf spring 20 to contact first flat 40 resulting in a second signal being injected into circuit board 34, wherein the second signal comprises a test signal for the AFCI second pole circuit. Upon receiving either the first or the second signal, arc fault detection circuitry on circuit board 34 generates a trip signal to solenoid 36 resulting in the actuation of solenoid 36 which causes a pair of separable contacts to separate and interrupt the current flow in circuit breaker 100 (FIG. 4). The precise testing mechanisms and signaling will be described in greater detail hereinafter.

Solenoid 36 includes a plunger assembly 44 at one end, wherein plunger assembly 44 includes a rod having an end extension 46 which attaches at a right angle to the plunger rod. End extension 46 comprises the component of plunger assembly 44 which moves within a recess 48 formed in circuit board 34. Referring to FIG. 2, the actuation of solenoid 36 causes plunger assembly 44 to move in a left-to-right direction and end extension 46 moves within recess 48 in a direction away from circuit board 34. End extension 46 is intended to engage a test mechanism 200 (shown in FIG. 7) which causes the pair of contacts to separate and interrupt current flow within circuit breaker 100, as will be described hereinafter.

Circuit board 34, test button assembly 32 and solenoid 36 and test mechanism 200 (FIG. 7) may be used as a component of any number of suitable circuit breakers in which the selected movement of single test button 10 permits one of two test signals to be injected into circuit board 34 resulting in the testing of both AFCI and GFCI circuits of both poles within circuit breaker 100. For the purpose of illustration only and not limitation, an exemplary dual pole arc circuit breaker 100 is illustrated in FIGS. 4–6.

Referring to FIG. 4, circuit breaker 100 comprises a first housing 102, a second housing 104, and a cover 106 that are assembled securely together with a plurality of bolts (not shown). First housing 102 defines a mechanical compartment 108, having load current carrying and switching components 110 disposed therein (see FIG. 5). Second housing 104 defines an electronics compartment 112, having current sensing components 114 and neutral current carrying components 116 disposed therein (see FIG. 6). A load current from a source (not shown) connects to a line connection 118 (see FIG. 5), and conducts along the current carrying and switching components 110 to a load lug 120 for customer connection to a load (not shown). A neutral current from the load connects to a neutral lug 122, (see FIG. 4) and conducts along the neutral current carrying components 116 to a neutral return wire 124 for customer connection to the source. Arc faults are sensed and processed by sensing components 114. As more particularly described hereinafter, arc fault circuit breaker 100 is preferably assembled such that electrical interconnections, i.e., electrical connections between the mechanical and electronics compartments 108 and 112, are made without disassembling any previously assembled compartment.

Figure 5:
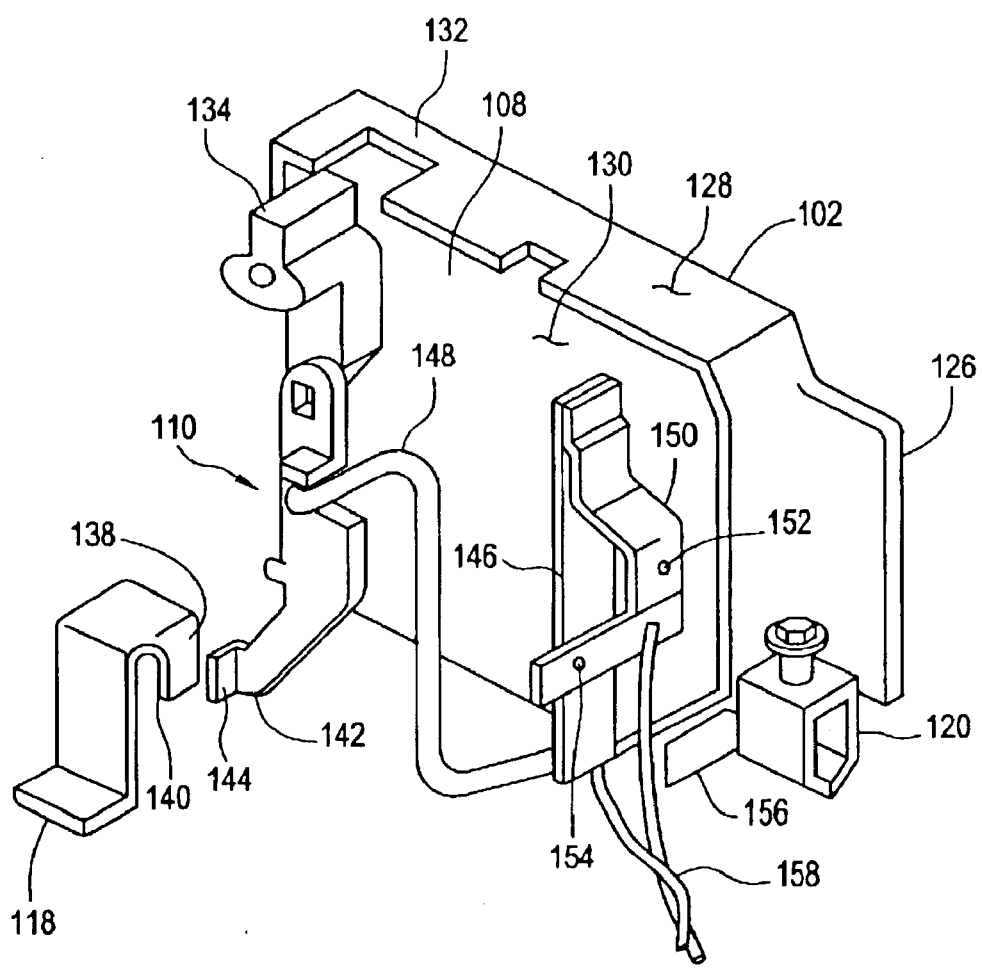
FIG. 5 is an exploded view of the mechanical compartment of the double pole circuit breaker of FIG. 4.
Figure 6:
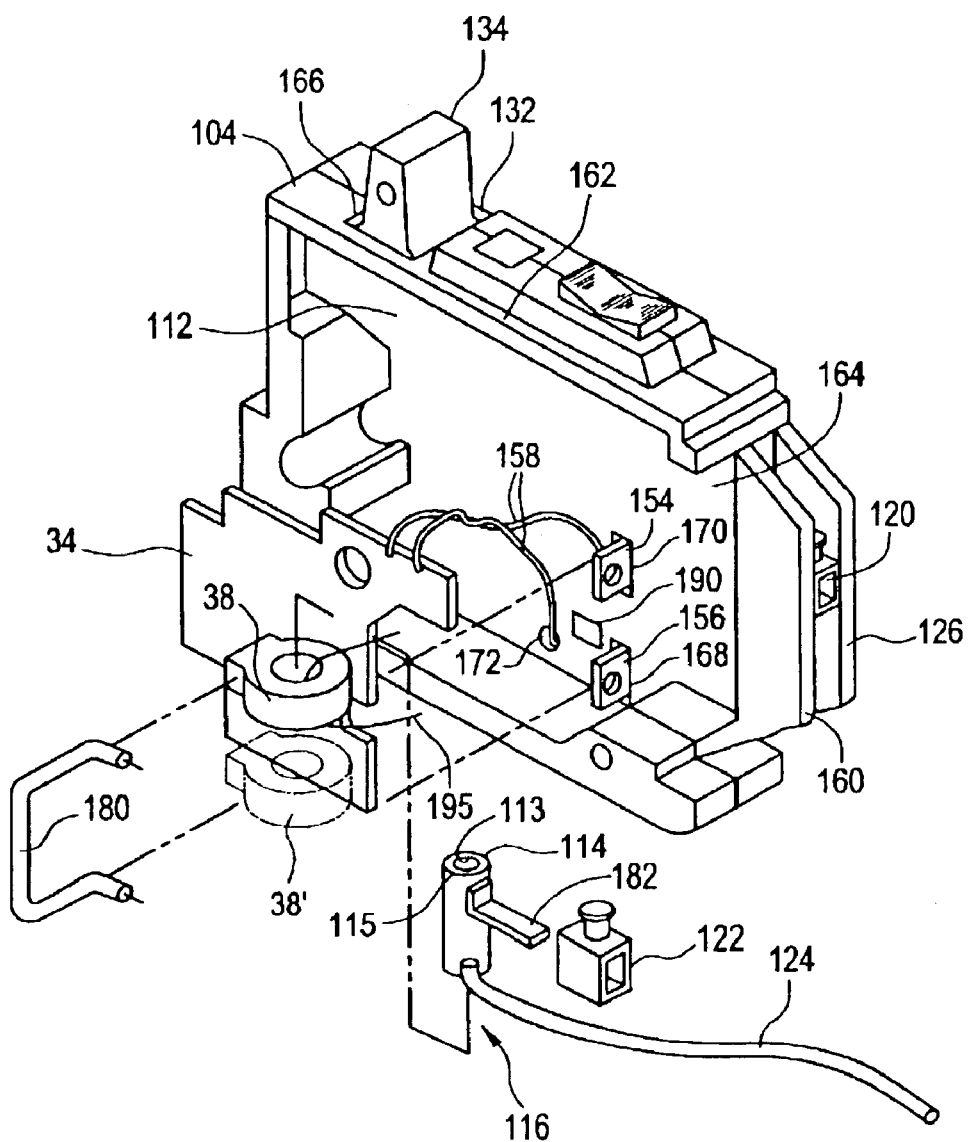
FIG. 6 is an exploded view of the electronics compartment of the double pole circuit breaker of FIG. 4.

Referring to FIG. 5, the mechanical compartment 108 is shown in detail. First housing 102 is generally rectangular in shape, and formed of electrical insulative material, i.e., plastic. First housing 102 comprises a first insulative tab 126, a first rim 128, and a first side wall 130. First tab 126 protrudes forwardly from the front of first housing 102 adjacent load lug 120 to provide an insulative barrier. First rim 128 extends around the periphery of first side wall 130. A first rectangular slot 132 is located in first rim 128 at the top and back of first housing 102 and is sized to receive a pole handle 134. First side wall 130 and first rim 128 define mechanical compartment 108 which includes the load current carrying and switching components 110. The load current carrying and switching components 110 within the mechanical compartment 108 are electrically connected, e.g., welded, bolted, or crimped, to form a load current path. The load current path begins at line connection 118 where the load current enters the mechanical compartment 108. Line connection 118 includes a lower tab 138 to connect to a source line (not shown), and a fixed contact 140 which extends downwardly from the upper end of line connection 118. A blade 142 is pivotally engaged to first housing 102 and is pivotally attached to insulated pole handle 134. A lower end of blade 142 includes a flat contact 144 which is forcibly biased against contact 140 to provide electrical continuity for the load current. Pole handle 134 is pivotally attached to first housing 102 and extends outwardly from mechanical compartment 108 into electronics compartment 112.

Blade 142 is electrically connected to a bottom distal end of a bimetal resistor 146 via a braid 148. A top distal end of bimetal resistor 146 is in turn electrically connected to an L-shaped strap 150. L-shaped strap 150 comprises a vertical strap body 152 and a horizontal strap extension 154. Horizontal strap extension 154 forms a substantially right angle with vertical strap body 152, and extends outwardly from mechanical compartment 108 into electronics compartment 112. A load terminal 156 also extends outwardly from the mechanical compartment 108 into electronics compartment 112. Load terminal 156 is in turn electrically connected to load lug 120. The load current path conducts the load current from the line connection 136, through contacts 140 and 144, through blade 142, braid 148, bimetal resistor 146, and L-shaped strap 150. At this point, the load current path passes out of the mechanical compartment 108 through horizontal strap extension 154. The load current path returns to the mechanical compartment 108 through load terminal 156 and out through the load lug i 20 to the load. When an arc fault is detected the pole handle 134 pivots clockwise, which in turn pivots blade 142 to separate contacts 140 and 144 and thereby open the load current path.

A twisted pair conductor 158 is electrically connected to the bottom distal end of bimetal resistor 146 and horizontal strap extension 154 of the L-shaped strap 150 to sense arcing from the line to neutral as is well known. This is accomplished by measuring the voltage drop across the bimetal resistor 146 that results from rapid changes in load current caused by arcing from line to neutral.

Referring to FIG. 6, the electronics compartment 112 is shown in detail. Second housing 104 is generally rectangular in shape and formed of electrical insulative material, i.e., plastic. Second housing 104 comprises a second insulative tab 160, a second rim 162, and a second side wall 164. Second tab 160 protrudes forwardly from the front of second housing 104 adjacent neutral lug 122 to provide an insulative barrier. Second rim 162 extends around the periphery of second side wall 164. A second rectangular slot 166 is located in rim 162 and cooperates with slot 132 to receive and secure pole handle 134 when housings 102 and 104 are assembled together. Second side wall 164 and second rim 162 define the electronics compartment 112 which includes the current sensing components 114 and the neutral current carrying components 116. The second housing 104 is assembled securely against first housing 102 with a plurality of bolts (not shown) to enclose mechanical compartment 108 and to capture the components within, as well as to insulate and secure load lug 120 between tabs 126 and 160.

Second side wall 164 of second housing 104 includes rectangular through holes 168 and 170 and circular through hole 172 to provide openings in the second housing 104 to permit the load terminal 156, horizontal strap extension 154 and twisted pair conductor 158 to extend through to the electronics compartment 112. This enables all electrical interconnections between compartments 108 and 112 to be completed in electronics compartment 112. During production, this allows compartments 108 and 112 to be assembled sequentially without the need to disassemble mechanical compartment 108. That is, mechanical compartment 108 is assembled first with the interconnecting components 154, 156 and 158 extending outwardly from the compartment 108. Second housing 104 is then assembled to first housing 102 enclosing the mechanical compartment 108, but allowing the interconnecting components 154, 156, and 158 to extend therethrough. The electronics compartment 112 may then be assembled and the associated components are interconnected to the components of the mechanical compartment 108 without any disassembly of mechanical compartment 112. This provides for a large work space for tooling and assembly when interconnecting the components of the compartments 108 and 112. Therefore, high quality interconnections are more consistently, and cost effectively made than in prior art circuit breakers.

Second side wall 164 further includes a window 190, preferably in the shape of a rectangle. Window 190 is intended to receive end extension 46 of plunger 44 of solenoid 36. More specifically, end extension 46 freely moves within window 190 upon actuation of solenoid 36 after circuit board 34 generates a trip signal which is received by solenoid 36. End extension 46 engages test mechanism 200 (shown in FIG. 7) to cause handle 134 to pivot resulting contacts 140 and 144 separating.

Current sensing components 114 comprise circuit board 34 which is electrically connected to solenoid 36, current sensing transformer 38 and optional current sensing transformer 38'. Upon receiving signals indicative of an arc fault, circuit board 34 provides an arc fault trip signal to trip the arc fault circuit breaker 100.

Twisted pair conductor 158 is electrically interconnected to circuit board 34. Circuit board 34 senses the voltage across the bi-metal resistor 146 and generates an arc fault trip signal in wire test 195 to create a current imbalance for the GFCI circuit to detect, as is discussed more fully below. Upon GFCI detection of the arc fault trip signal simulating a ground fault, the GFCI circuit generates a trip signal to actuate solenoid 36 in response to a rapid voltage drop indicative of arcing across the line and neutral leads. In this manner, the arc fault detection circuit for each pole in circuit board 34 uses the ground fault detection circuit in circuit board 34 as a tripping mechanism when an arc fault is detected.

The load current path is completed by electrically interconnecting strap extension 154 and load terminal 156 to respective distal ends of a wire connector 180. Wire connector 180 can be formed from various suitable conductive materials, e.g., insulated wire, rectangular formed magnetic wire, square formed magnetic wire, or insulated sleeve covered braided copper. Wire connector 180 is routed through a center of sensing transformer 38 such that the flow of the load current through the center of transformer 38 is in a known direction.

The neutral current carrying components 116 within the electronics compartment 112 are electrically connected, e.g., welded, bolted, or crimped, to form a neutral current path for the neutral current. The neutral current path begins at neutral lug 122 where the neutral current enters the electronics compartment 112. Neutral lug 122 secures the neutral lead connected to the load against a neutral terminal 182 to provide electrical continuity thereto. Neutral terminal 182 is electrically connected to neutral return wire 124 via a copper braid (not shown). An insulated sleeve 114 surrounds a portion of the copper braid and provides electrical insulation between the copper braid and circuit board 34. The copper braid is routed through the center of sensing transformer 38 such that the flow of the neutral current through the center of transformer 38 is in the opposite direction of the flow of the load current through wire connector 180.

Both the copper braid of the neutral current path, and wire connector 180 of the load current path are routed through the current sensing transformer 38 to sense arcing from line to ground as is well known. This is accomplished by routing the flow of the neutral current through the sensing transformer 38 in the opposite direction to the flow of the load current. The total current flow through sensing transformer 38 thus cancels unless an external ground fault current is caused by arcing from line to ground. The resulting differential signal, sensed by sensing transformer 38, is indicative of the ground fault current and is processed by circuit board 34.

Optional current sensing transformer 38' is used for ground fault applications where a separate sensor is needed to detect improper wiring by the customer, e.g., the neutral current path is wired backwards. That is, the copper braid of the neutral current path is routed through the optional current sensing transformer 38'. The resulting signal, sensed by optional current sensing transformer 38', is indicative of the neutral current direction and magnitude, and is processed by circuit board 34.

Figure 7:
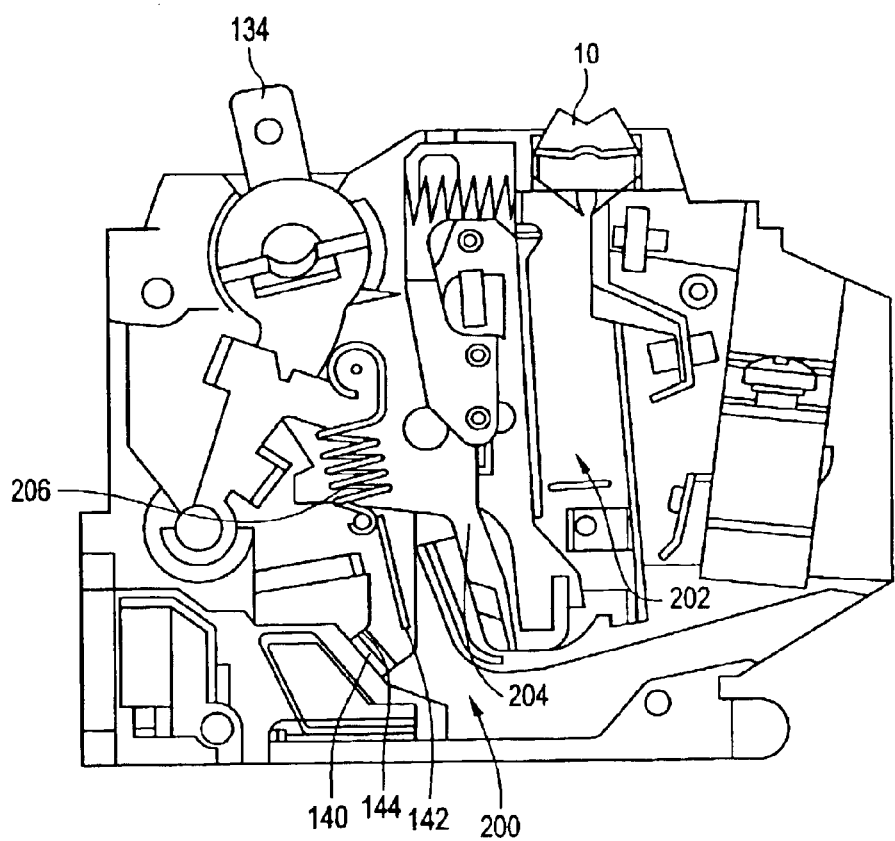
FIG. 7 is a side elevation view of a dual test mechanism including the single test button of FIG. 1 for use in a circuit breaker.

Turning now to FIGS. 1–7. FIG. 7 illustrates test mechanism 200 in greater detail. It being understood that test mechanism 200 of FIG. 7 is merely exemplary in nature and it is within the scope of the present disclosure that another known test mechanism 200 may be employed with test button assembly 32 including dual test button 10 and circuit board 34 to cause handle 134 to pivot resulting in contacts 140 and 144 opening to interrupt current during either AFCI or GFCI trip conditions. Test mechanism 200 includes a latch assembly 202 having a pivotable armature latch (not shown). The pivotable armature latch comprises the main component of test mechanism 200 which interacts with end extension 46 in that upon actuation of solenoid 36, the solenoid rod is driven causing end extension 46 to ride within window 190 in circuit board 34 (FIG. 6). As end extension 46 is driven itself, it contacts the armature latch causing the armature latch to rotate counterclockwise.

The pivotable armature latch selectively engages and positions a cradle 204 so that when the armature latch is rotated counter clockwise, cradle 204 is released from the armature latch resulting in cradle 204 being free to rotate. Cradle 204 rotates downward in a clockwise manner and falls out of window 190. A spring 206 interconnected between blade 142 and cradle 204 creates a biasing force therebetween so that when cradle 204 rotates clockwise, after being released from the armature latch, the spring biasing forces causes blade 142 and handle 134 to rotate to a trip position, wherein contacts 140 and 144 are opened.

As best shown in FIGS. 2 and 6, a test wire 195 is routed through sensing transformer 38, such that the flow of current in test wire 195 through the center of sensing transformer 38 is in a known direction. During non-test and non-trip conditions, the total current flowing in opposite directions through transformer 38 cancels one another and thus sensing transformer 38 does not detect a differential signal, which is indicative of a trip or test condition. Test wire 195 is electrically connected to circuit board 34 so that when a ground fault condition exists a current is passed through test wire 195 causing a current differential through sensing transformer 38. More specifically, one end of test wire 195 is electrically connected to a GFCI circuit within circuit board 34 and an opposite end of test wire 195 is electrically connected to horizontal strap extension 154 after test wire 19S has passed through sensing transformer 38.

Referring to FIGS. 1–7 and particularly to FIG. 8, in exemplary circuit breaker 100, the testing of AFCI and GFCI functionality associated with one pole of circuit breaker 100 proceeds in the following manner. First cantilevered surface 12 of test button 10 is depressed causing pivotable leaf spring 20 to contact second flat 42 resulting in the first signal being injected into circuit board 34. The first signal comprises a test signal for the AFCI circuit associated with one pole of circuit breaker 100 and in response to the first signal, circuit board 34 generates an AFCI trip signal 300 which is communicated with current transformer 38 via test wire 195. Test wire 195 is routed through sensing transformer 38 and carries current through sensing transformer 38 thereby canceling the indifference in total current flowing through. sensing transformer 38 because the opposing flow of current through sensing transformer 38 no longer cancels one another. The resulting differential signal, sensed by sensing transformer 38, is indicative of a ground fault current and is processed by the GFCI circuit on circuit board 34. As previously described, in response to the AFCI trip signal 300, the GFCI circuit 304 generates a trip signal 308 to solenoid 36, which is communicated with solenoid 36. Upon receipt of the trip signal, solenoid 36 is actuated and engages test mechanism 200 to cause rotation of handle 134 and opening of contacts 140 and 144 in the manner described hereinbefore.

Test button 10 is designed so that once first cantilevered portion 12 is no longer depressed, test button 10 moves back to its original off position, wherein pivotable leaf spring 20 is centered and not in contact with either first or second flats 40 and 42. Consequently, after the trip mechanism of circuit breaker 100, including handle 134, blade 142 and contacts 140 and 144 are reset to a non-trip position, test button 10 is in an off position and thus no test signals are being delivered to circuit board 34.

In order to test the AFCI circuit associated with the other pole of circuit breaker 100, second cantilevered surface 14 is depressed causing pivotable leaf spring 20 to contact first flat 40 resulting in the second signal being injected into circuit board 34 in the following manner. Upon contact between pivotable leaf spring 20 and first flat 40, a second AFCI trip signal is generated in test wire 195 to induce the ground fault detection circuit 304 to generate trip signal 308 as described above.

Either AFCI circuit associated with each pole of circuit breaker 100 can initiate a trip by turning "ON" a corresponding silicon controlled rectifier (SCR) 310. When depressing test button 10 to test a corresponding pole, a corresponding SCR 310 turns on and a current path is provided between line hot and neutral. This current path through the corresponding SCR 310 allows current to flow through test wire 195 passing through the differential current transformer 38, which is used to initiate trip signal 308 by detection of the current imbalance using ground fault detection circuit 304. Thus, the AFCI circuitry uses the GFCI circuitry as a tripping mechanism in normal operation, as well as in a test mode for testing both poles of circuit breaker 100.

Figure 8:
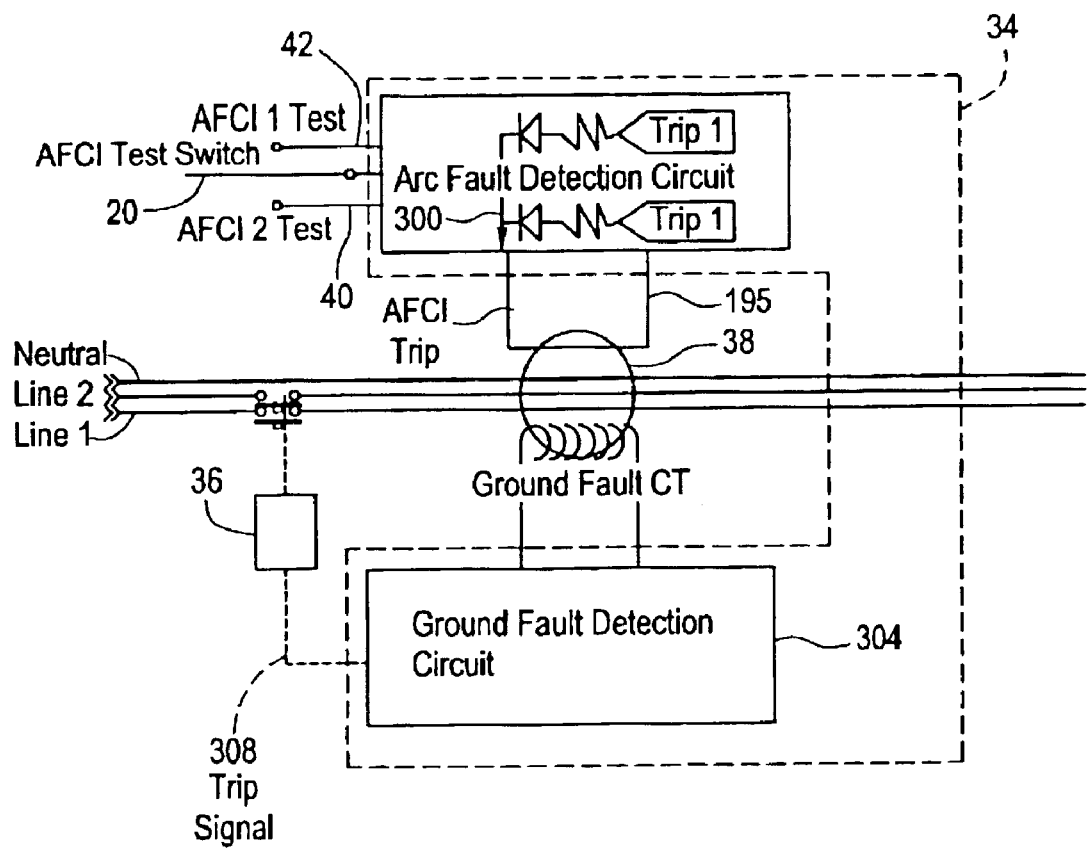
FIG. 8 is a schematic of an exemplary circuit for the single test button to test AFCI and GFCI circuit functionality in a double pole circuit breaker.

Thus, the schematic of exemplary circuitry in FIG. 8 illustrates a means for providing a first test signal and a second test signal, wherein the first test signal is generated to test an AFCI circuit in one pole and the second signal is generated to test an AFCI circuit in another pole. Test button assembly 32 is merely one exemplary means for providing these two signals and it is within the scope of the present disclosure that other means may be used such as a switching device, e.g., toggle switch having two positions which generate first and second test signals.

Of course one of skill in the art would appreciate that the test mechanism 200 and dual test button 10 may be employed in a one pole, three pole or more arc fault circuit breaker. In these embodiments employing a different number of poles, the AFCI and GFCI circuitry of the circuit breaker are easily and conveniently tested.

Referring now to FIG. 9, a flowchart outlining an exemplary electronic tripping method for an AFCI two pole circuit breaker and a single test button 10 for testing AFCI and GFCI functionality of both poles is illustrated. Block 400 indicates initiation of operation and testing of a two pole circuit breaker. At block 402, arc fault detection circuitry on circuit board 34 checks for an arc fault on both poles. Blocks 404 and 406 represent initiation of testing arc fault and ground fault functionality on both poles, respectively. When test button 10 is operated to select one or the other pole, a AFCI trip signal is generated, blocks 408 and 410, respectively, and communicated to Block 402. When Block 402 detects an arc fault as a result of depressing test button 10 or during normal operation of the circuit breaker, Block 412 generates an AFCI trip signal that simulates a ground fault to the ground fault detection circuitry, Block 414. If Block 402 does not detect an arc fault, a ground fault is checked at Block 414. If no ground fault is detected at Block 414, then Block 402 as indicated by lines 416 and 418. If the ground fault detection circuitry detects a ground fault, either by a current imbalance from current flow in test wire 195 or otherwise, a trip signal is generated to the solenoid 36, Block 420. At Block 422, the circuit breaker is tripped due to the actuation of the solenoid at Block 420 to separate the contacts. The circuit breaker may then be reset at Block 424 to check arc fault and ground fault functionality as to the other pole. If test button 10 was depressed to check one of the poles at either of Block 404 or 406, and the ground fault detection circuitry at Block 414 does not detect a ground fault to generate a trip signal at Block 420, the circuit breaker arc fault and/or ground fault functionality is compromised, Block 426. In the absence of the circuit breaker tripping at Block 422 upon depression of the test button at Blocks 404, 406, the user is on notice of arc fault and ground fault malfunction. The user can then select the other pole to test for this malfunction via test button 10, to check for a similar malfunction with the other pole.

The above described exemplary embodiments provide isolation between the trip signal and the line voltages without the use of opto-couplers, in a manner that requires only a single test switch to test both AFCI poles, plus ground fault functionality. By adding circuitry to the AFCI circuitry that simulates a ground fault, the AFCI circuitry can force the ground fault circuitry to trip the breaker. Using this methodology, any AFCI trip also exercises the ground fault circuitry as the tripping mechanism. Therefore, only a single switch is required to completely test the AFCI 2-pole breaker. A single switch is not only less expensive to implement, but provides a simpler interface for the end user.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A trip circuit for a circuit breaker comprising:
    an arc fault detection circuit;
    a ground fault detection circuit,
    a signal indicative of an arc fault in a corresponding pole of the circuit breaker; and
    a trip mechanism including a pair of separable contacts, said trip mechanism in operable communication with said ground fault detection circuitry so that in response to receiving said signal, said arc fault detection circuitry causes said ground fault detection circuitry to generate a trip signal causing said trip mechanism to separate said pair of separable contacts.

2. The trip circuit of claim 1 wherein said signal is generated by one of an arc fault and a switch assembly having signaling components in operable communication with said arc fault detection circuitry, said signaling components configured to selectively provide operable communication with said arc fault detection circuitry.

3. The trip circuit of claim 2 wherein said signaling components are configured to selectively generate said signal to a corresponding pole of the circuit breaker.

4. The trip circuit of claim 1 wherein said arc fault detection circuitry includes an arc fault circuit interruption circuit (AFCI) for each said corresponding pole and said ground fault detection circuitry includes a ground fault circuit interruption (GFCI) circuit.

5. The trip circuit of claim 4 wherein said switch assembly comprises a first test position for a first said AFCI circuit for a first pole and a second test position for a second said AFCI circuit for a second pole.

6. The trip circuit of claim 5 wherein said signal initiates a trip in said first AFCI circuit by turning on a first silicon controlled rectifier (SCR) in said first AFCI circuit providing a current in operable communication with said GFCI circuit in said first test position and wherein said signal initiates said trip in said second AFCI circuit by turning on a second silicon controlled rectifier (SCR) in said second AFCI circuit providing said current in operable communication with said GFCI circuit in said second test position.

7. The trip circuit of claim 6 wherein said current in operable communication with said GFCI circuit is by means of a current sensing transformer disposed in the circuit breaker; said current causes a current imbalance detected by said GFCI circuit resulting in generation of a second trip signal.

8. The trip circuit of claim 7 wherein said means includes passing current through said current sensing transformer and said GFCI circuit is in operable communication with said current transformer via a secondary winding.

9. The trip circuit of claim 1 wherein said signal generates a current in operable communication with said GFCI circuit is by means of a current sensing transformer disposed in the circuit breaker; said current causes a current imbalance detected by said GFCI circuit resulting in generation of a second trip signal.

10. The trip circuit of claim 9 wherein said means includes passing current through said current sensing transformer and said GFCI circuit is in operable communication with said current transformer via a secondary winding.

11. The trip circuit of claim 10 wherein said trip mechanism includes a solenoid which is in operable communication with said GFCI circuit and actuation of said solenoid causes said contacts to separate.

12. The trip circuit of claim 11 wherein said solenoid is actuated by receipt of said second trip signal from said GFCI circuit.

13. The trip circuit of claim 1 wherein said trip mechanism is in operable communication with said ground fault circuitry so that in response to an arc fault in any said corresponding pole, said arc fault detection circuitry generates said trip signal to said ground fault detection circuitry causing said trip mechanism to separate said pair of separable contacts.

14. The trip circuit of claim 13 wherein said trip signal is received by said ground fault detection circuitry using a current sensing transformer.

15. The trip circuit of claim 2 wherein said switch assembly and said arc fault detection circuit are configured for use with one or more poles in the circuit breaker.

16. A circuit breaker comprising:
   a trip unit including circuitry;
   a pair of separable contacts for interrupting a flow of current; and
   an arc fault detection circuit;
   a ground fault detection circuit,
   a signal indicative of an arc fault in a corresponding pole of the circuit breaker; and
   a trip mechanism including a pair of separable contacts, said trip mechanism in operable communication with said ground fault detection circuitry so that in response to receiving said signal, said arc fault detection circuitry causes said ground fault detection circuitry to generate a trip signal causing said trip mechanism to separate said pair of separable contacts.

17. The circuit breaker of claim 16 wherein said signal is generated by one of an arc fault and a switch assembly having signaling components in operable communication with said arc fault detection circuitry, said signaling components configured to selectively provide operable communication with said arc fault detection circuitry.

18. The circuit breaker of claim 17 wherein said signaling components are configured to selectively generate said signal to a corresponding pole of the circuit breaker.

19. The circuit breaker of claim 16 wherein said arc fault detection circuitry includes an arc fault circuit interruption circuit (AFCI) for each said corresponding pole and said ground fault detection circuitry includes a ground fault circuit interruption (GFCI) circuit.

20. The circuit breaker of claim 19 wherein said switch assembly comprises a first test position for a first said AFCI circuit for a first pole and a second test position for a second said AFCI circuit for said second pole.

21. The circuit breaker of claim 16 wherein said signal generates a current in operable communication with said GFCI circuit is by means of a current sensing transformer disposed in the circuit breaker; said current causes a current imbalance detected by said GFCI circuit resulting in generation of a second trip signal.

22. The circuit breaker of claim 21 wherein said means includes passing current through said current sensing transformer and said GFCI circuit is in operable communication with said current transformer via a secondary winding.

23. The circuit breaker of claim 22 wherein said trip mechanism includes a solenoid which is in operable communication with said GFCI circuit and actuation of said solenoid causes said contacts to separate.

24. The circuit breaker of claim 23 wherein said solenoid is actuated by receipt of said second trip signal from said GFCI circuit.

25. The circuit breaker of claim 16 wherein said trip mechanism is in operable communication with said ground fault circuitry so that in response to an arc fault in any said corresponding pole, said arc fault detection circuitry generates said trip signal to said ground fault detection circuitry causing said trip mechanism to separate said pair of separable contacts.

26. The circuit breaker of claim 25 wherein said trip signal is received by said ground fault detection circuitry using a current sensing transformer.

27. The circuit breaker of claim 17 wherein said switch assembly and said arc fault detection circuit are configured for use with one or more poles in the circuit breaker.

28. The test mechanism of claim 16 wherein said trip mechanism includes a pivotable handle.

29. The test mechanism of claim 28 wherein said trip mechanism includes a solenoid which is in operable communication with said GFCI circuit and actuation of said solenoid causes said handle to pivot and separate said contacts.

30. The test mechanism of claim 29 wherein said solenoid is actuated by receipt of a second trip signal from said GFCI circuit.

31. A method of using an arc fault trip signal to generate a ground fault to trip a circuit breaker, the method comprising:
   generating the arc fault trip signal in a current sensing transformer, said arc fault trip signal indicative of an arc fault;
   receiving a current in a GFCI circuit in response to said arc fault, said current indicative of a ground fault; and
   generating a trip signal causing a trip mechanism of the circuit breaker to separate a pair of contacts.

32. The method of claim 31 wherein said arc fault trip signal is generated by one of selecting a corresponding pole to simulate an arc fault condition using a switching assembly to select said corresponding pole to generate said arc fault trip signal and detecting said arc fault condition in any said corresponding pole.

33. The method of claim 32 wherein said selecting said corresponding pole includes selecting between one or more poles of the circuit breaker.

34. The method of claim 31 wherein said arc fault trip signal is received in a respective AFCI circuit for each pole.

35. The method of claim 34 wherein each said respective AFCI circuit uses said GFCI circuit as a tripping mechanism.

36. The method of claim 34 wherein each said respective AFCI circuit uses said GFCI circuit as a tripping mechanism, while also testing for GFCI functionality.

37. The method of claim 31 wherein said receiving current in said GFCI circuit includes a secondary winding in operable communication with said GFCI circuit and said current sensing transformer.

* * * * *